US011627080B2

(12) United States Patent
Hira et al.

(10) Patent No.: US 11,627,080 B2
(45) Date of Patent: Apr. 11, 2023

(54) SERVICE INSERTION IN PUBLIC CLOUD ENVIRONMENTS

(71) Applicant: VMware, Inc., Palo Alto, CA (US)

(72) Inventors: Mukesh Hira, Palo Alto, CA (US); Rahul Jain, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 3 days.

(21) Appl. No.: 16/251,083

(22) Filed: Jan. 18, 2019

(65) Prior Publication Data

US 2020/0236047 A1 Jul. 23, 2020

(51) Int. Cl.
*H04L 12/46* (2006.01)
*H04L 12/28* (2006.01)
(Continued)

(52) U.S. Cl.
CPC ........ *H04L 45/745* (2013.01); *G06F 9/45558* (2013.01); *H04L 12/4633* (2013.01);
(Continued)

(58) Field of Classification Search
CPC . H04L 61/2557; H04L 69/22; H04L 2212/00; H04L 12/4641; H04L 12/4633;
(Continued)

(56) References Cited

U.S. PATENT DOCUMENTS 8,830,834 B2 9/2014 Sharma et al.
8,989,192 B2 3/2015 Foo et al.
(Continued)

FOREIGN PATENT DOCUMENTS

CN 103217953 A 7/2013
CN 103369027 A 10/2013
(Continued)

OTHER PUBLICATIONS

International Search Report and Written Opinion of the International Searching Authority, International application No. PCT/US2020/013954, dated Mar. 25, 2020.
(Continued)

*Primary Examiner* — Khaled M Kassim
*Assistant Examiner* — Jason A Harley
(74) *Attorney, Agent, or Firm* — SU IP Consulting

(57) ABSTRACT

Example methods are provided a network device to perform service insertion in a public cloud environment that includes a first virtual network and a second virtual network. In one example method, in response to receiving a first encapsulated packet from a first virtualized computing instance located in the first virtual network, the network device may generate a decapsulated packet by performing decapsulation to remove, from the first encapsulated packet. The method may also comprise identifying a service path specified by a service insertion rule, and sending the decapsulated packet to the service path to cause the service path to process the decapsulated packet according to one or more services. The method may further comprise: in response to the network device receiving the decapsulated packet processed by the service path, sending the decapsulated packet, or generating and sending a second encapsulated packet, towards a destination address.

18 Claims, 9 Drawing Sheets

(51) Int. Cl.

| | |
|---|---|
| *H04L 12/66* | (2006.01) |
| *H04L 41/122* | (2022.01) |
| *H04W 72/04* | (2009.01) |
| *H04L 41/12* | (2022.01) |
| *H04L 45/302* | (2022.01) |
| *H04L 49/20* | (2022.01) |
| *H04L 45/745* | (2022.01) |
| *G06F 9/455* | (2018.01) |
| *H04L 45/02* | (2022.01) |
| *H04L 49/354* | (2022.01) |
| *H04L 49/00* | (2022.01) |
| *H04L 69/22* | (2022.01) |

(52) U.S. Cl.
CPC .......... *H04L 12/4641* (2013.01); *H04L 45/04* (2013.01); *H04L 49/354* (2013.01); *H04L 49/70* (2013.01); *H04L 69/22* (2013.01); *H04L 2212/00* (2013.01)

(58) Field of Classification Search
CPC . H04L 63/0272; H04L 49/354; H04L 45/745; H04L 67/1031; H04W 28/065
USPC .................................................. 370/392, 474
See application file for complete search history.

(56) References Cited

U.S. PATENT DOCUMENTS

| | | | |
|---|---|---|---|
| 9,130,872 B2 | 9/2015 | Kumar et al. | |
| 9,531,850 B2 * | 12/2016 | Nainar | H04L 69/22 |
| 10,021,196 B1 | 7/2018 | Akers et al. | |
| 10,148,459 B2 | 12/2018 | Chiu et al. | |
| 10,333,822 B1 * | 6/2019 | Jeuk | H04L 45/12 |
| 10,536,563 B2 | 1/2020 | Wang et al. | |
| 10,560,345 B2 | 2/2020 | Patel et al. | |
| 2010/0254385 A1 * | 10/2010 | Sharma | H04L 12/4633 |
| | | | 370/392 |
| 2012/0082048 A1 * | 4/2012 | Taft | H04L 12/1836 |
| | | | 370/252 |
| 2013/0163594 A1 * | 6/2013 | Sharma | H04L 12/4633 |
| | | | 370/392 |
| 2013/0254762 A1 | 9/2013 | Cochran | |
| 2013/0282867 A1 * | 10/2013 | Otake | H04L 12/4625 |
| | | | 709/217 |
| 2014/0050223 A1 * | 2/2014 | Foo | H04L 45/74 |
| | | | 370/400 |
| 2014/0215010 A1 | 7/2014 | Liang et al. | |
| 2016/0087940 A1 | 3/2016 | Miller et al. | |
| 2016/0119226 A1 * | 4/2016 | Guichard | H04L 45/306 |
| | | | 370/392 |
| 2016/0157274 A1 * | 6/2016 | Akiyoshi | H04W 76/12 |
| | | | 370/254 |
| 2016/0337234 A1 * | 11/2016 | Duda | H04L 45/74 |
| 2016/0352538 A1 | 12/2016 | Chiu et al. | |
| 2017/0126435 A1 | 5/2017 | Benny et al. | |
| 2018/0069924 A1 * | 3/2018 | Tumuluru | H04L 45/72 |
| 2018/0115519 A1 | 4/2018 | Bonomi et al. | |
| 2018/0139073 A1 * | 5/2018 | Han | H04L 12/4625 |
| 2018/0173557 A1 * | 6/2018 | Nakil | H04L 41/0631 |
| 2018/0198854 A1 * | 7/2018 | Rong | H04L 47/125 |
| 2018/0241809 A1 * | 8/2018 | Gandhi | G06F 15/17331 |
| 2019/0123962 A1 * | 4/2019 | Guo | H04L 41/0893 |
| 2019/0245949 A1 * | 8/2019 | Wang | H04L 41/083 |
| 2019/0391741 A1 * | 12/2019 | Barinov | G06F 9/4498 |
| 2019/0392070 A1 * | 12/2019 | Johnson | G06F 16/2443 |
| 2020/0213224 A1 * | 7/2020 | Cheng | H04L 45/04 |
| 2020/0236046 A1 | 7/2020 | Jain et al. | |
| 2021/0021486 A1 | 1/2021 | Jain et al. | |

FOREIGN PATENT DOCUMENTS

| | | |
|---|---|---|
| CN | 105591873 A | 5/2016 |
| CN | 107077367 A | 8/2017 |
| CN | 107948086 A | 4/2018 |
| WO | 2016065097 A1 | 4/2016 |

OTHER PUBLICATIONS

International Search Report and Written Opinion of the International Searching Authority, International application No. PCT/US2019/036812, dated Oct. 9, 2019.

* cited by examiner

SERVICE INSERTION IN PUBLIC CLOUD ENVIRONMENTS

CROSS-REFERENCE TO RELATED APPLICATION

The present application is related in subject matter to U.S. patent application Ser. No. 16/251,080, which is incorporated herein by reference.

BACKGROUND

Unless otherwise indicated herein, the approaches described in this section are not admitted to be prior art by inclusion in this section.

Virtualization allows the abstraction and pooling of hardware resources to support virtual machines in a software-defined data center (SDDC). For example, through server virtualization, virtualization computing instances such as virtual machines (VMs) running different operating systems may be supported by the same physical machine (e.g., referred to as a "host"). Each VM is generally provisioned with virtual resources to run a guest operating system and applications. The virtual resources may include central processing unit (CPU) resources, memory resources, storage resources, network resources, etc. In practice, various network-related problems may occur, which adversely affects the performance of hosts and VMs.

In practice, a user (e.g., organization) may run various applications using "on-premise" data center infrastructure in a private cloud environment that is under the user's ownership and control. Alternatively or additionally, the user may run applications "in the cloud" using infrastructure under the ownership and control of a public cloud provider. In the latter case, it may be challenging to provide various services (e.g., firewall) for applications running in a public cloud environment.

DETAILED DESCRIPTION

Figure 1:
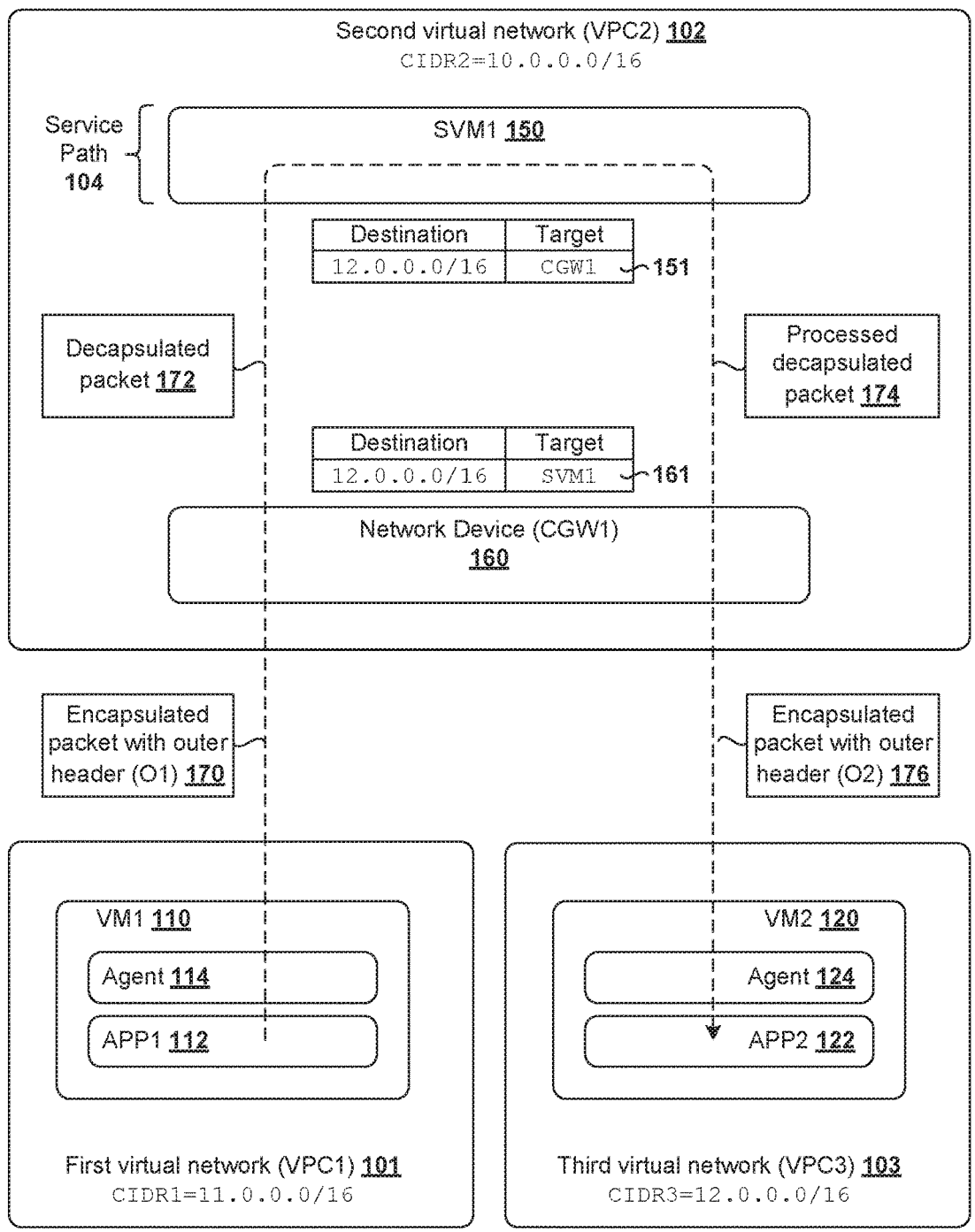
FIG. 1 is a schematic diagram illustrating an example public cloud environment in which service insertion may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to configuring and providing services in public cloud environments will now be explained in more detail using FIG. 1, which is a schematic diagram illustrating example public cloud environment 100 in which service insertion may be performed. It should be understood that, depending on the desired implementation, public cloud environment 100 may include additional and/or alternative components than that shown in FIG. 1.

In the example in FIG. 1, public cloud environment 100 includes multiple virtual networks 101-103 that are logically isolated from each other. For example, VM1 110 may be deployed in first virtual network 101 to run application APP1 112, and VM2 120 in third virtual network 103 to run APP2" 122 "in the cloud" using another entity's (i.e., cloud provider) infrastructure. In practice, a cloud provider is generally an entity that offers a cloud-based platform to multiple users or tenants. This way, the tenants may take advantage of the scalability and flexibility provided by public cloud environment 100 to extend the physical capability of their respective on-premise data centers.

Throughout the present disclosure, the term "virtual network" in a public cloud environment may refer generally to a software-implemented network that is logically isolated from at least one other virtual network in the public cloud environment. For example, virtual networks 101-103 may be Amazon Virtual Private Clouds (VPCs) provided by Amazon Web Services® (AWS). Amazon VPC and Amazon AWS are registered trademarks of Amazon Technologies, Inc. Using the AWS example in FIG. 1, virtual networks 101-103 are also labelled "VPC1" 101, "VPC2" 102 and "VPC3" 103, respectively. In practice, other types of virtual network may be used, such as Azure Virtual Networks (VNets) from Microsoft Azure®; VPCs from Google Cloud Platform™; VPCs from IBM Cloud™; a combination thereof, etc.

Figure 2:
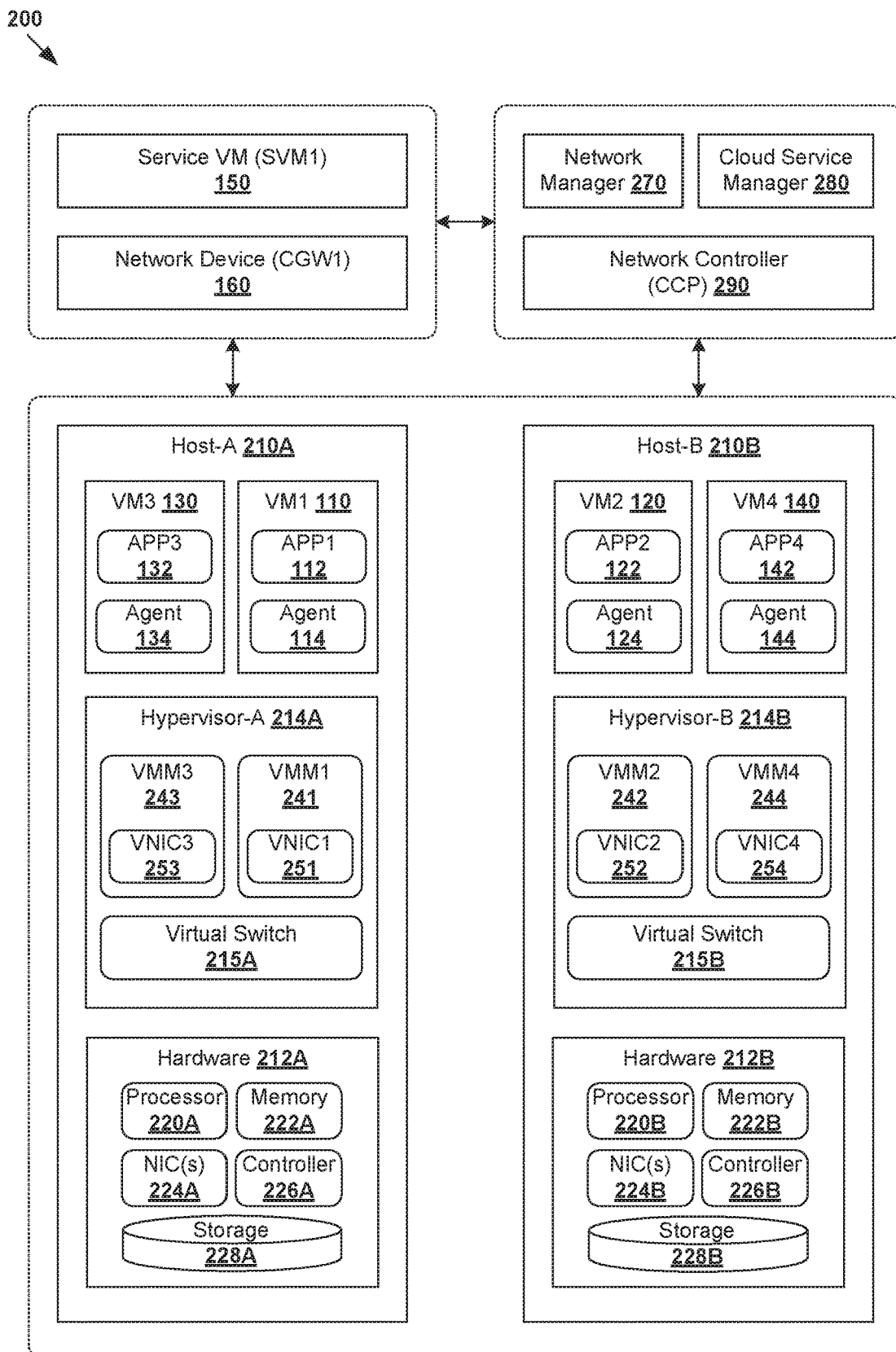
FIG. 2 is a schematic diagram illustrating a physical implementation view of the public cloud environment in FIG. 1.

VMs 110-120 will be explained in more detail using FIG. 2, which is a schematic diagram illustrating physical implementation view 200 of example public cloud environment 100 in FIG. 1. Depending on the desired implementation, physical implementation view 200 may include additional and/or alternative component(s) than that shown in FIG. 2. In the example in FIG. 2, VMs 110-140 may be supported by hosts 210A-B (also known as "end hosts," "computing devices", "host computers", "host devices", "physical servers", "server systems", "physical machines" etc.). For example, VM3 130 and VM4 140 may be deployed in third virtual network 103 to run respective applications "APP3" 132 and "APP4" 142 in the cloud.

Hosts 210A-B may each include virtualization software (e.g., hypervisor 214A/214B) that maintains a mapping between underlying hardware 212A/212B and virtual resources allocated to VMs 110-140. Hosts 210A-B may be interconnected via a physical network formed by various intermediate network devices, such as physical network devices (e.g., physical switches, physical routers, etc.) and/or logical network devices (e.g., logical switches, logical routers, etc.). Hardware 212A/212B includes suitable physical components, such as processor(s) 220A/220B; memory 222A/222B; physical network interface controller(s) or NIC(s) 224A/224B; and storage disk(s) 228A/228B accessible via storage controller(s) 226A/226B, etc.

Virtual resources are allocated to each VM to support a guest operating system (OS) and applications (see 112/122/132/142). Agent 114/124/134/144 may be configured on each VM 110/120/130/140 to perform any suitable processing to support packet handling (e.g., encapsulation and decapsulation), etc. Corresponding to hardware 212A/212B, the virtual resources may include virtual CPU, virtual memory, virtual disk, virtual network interface controller (VNIC), etc. Hardware resources may be emulated using virtual machine monitors (VMMs) 241-244, which may be considered as part of (or alternatively separated from) corresponding VMs 110-140. For example in FIG. 2, VNICs 251-254 are virtual network adapters that are emulated by corresponding VMMs 241-244.

Although examples of the present disclosure refer to VMs, it should be understood that a "virtual machine" running on a host is merely one example of a "virtualized computing instance." or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system. The term "hypervisor" may refer generally to a software layer or component that supports the execution of multiple virtualized computing instances, including system-level software in guest VMs that supports namespace containers such as Docker, etc.

Hypervisor 214A/214B further implements virtual switch 215A/215B to handle egress packets from, and ingress packets to, corresponding VMs 110-140. The term "packet" may refer generally to a group of bits that can be transported together from a source to a destination, such as message, segment, datagram, etc. The term "traffic" may refer generally to a flow of packets. The term "layer 2" may refer generally to a Media Access Control (MAC) layer; "layer 3" to a network or Internet Protocol (IP) layer; and "layer-4" to a transport layer (e.g., using transmission control protocol (TCP) or user datagram protocol (UDP)) in the Open System Interconnection (OSI) model, although the concepts described herein may be used with other networking models.

Network manager 270, cloud service manager 280 and network controller 290 are example network management entities that facilitate management of various entities deployed in public cloud environment 100. An example network controller is the NSX controller component of VMware NSX® (available from VMware, Inc.) that resides on a central control plane. Network manager 270 (e.g., NSX manager) and cloud service manager 280 may be entities that reside on a management plane. Cloud service manager 280 may provide an interface for end users to configure their public cloud inventory (e.g., VMs 110-140) in public cloud environment 100. Management entity 270/280/290 may be implemented using physical machine(s), virtual machine(s), a combination thereof, etc.

Referring to FIG. 1 again, service path 104 may be "inserted" between source and destination endpoints (e.g., VMs) to provide various service(s) in public cloud environment 100. In particular, each service path 104 may include at least one (i.e., N≥1) service virtualized computing instance (also known as "service endpoint," "service VM" (SVM) or "virtual network function" (VNF)). For example, SVM1 150 may be "inserted" along a datapath between VM1 110 and VM2 120 to provide a firewall service for security purposes. This way, a packet flow between VM1 110 and VM2 120 may be steered or forwarded via SVM1 150, which decides whether to allow or drop packets according to any suitable firewall rules. Although one service VM is shown in FIG. 1 for simplicity, it should be understood that service path 104 may include multiple SVMs (forming a service chain), such as SVM1 150 providing the firewall service and another SVM providing a network address translation (NAT) service, etc. In practice, a service chain may represent an instantiation of an ordered set of service functions.

Conventionally, there are various challenges associated with service insertion in public cloud environment 100. For example, in contrast with on-premise infrastructure, a user generally does not have any direct control over underlying hypervisors and hardware that support VMs 110-140 and SVM1 150. One conventional approach is to deploy SVM1 150 in the same VPC as VM 110/120, and modifying a default route in an underlay route table to forward packets to SVM1 150. However, this imposes a limitation on the deployment of SVM1 150, which some users may find undesirable for performance and scalability reasons.

Service Insertion

According to examples of the present disclosure, service insertion may be performed in an improved manner using network device 160 deployed in the same virtual network 102 as SVM1 150. In the example in FIG. 1, an example network device 160 in the form of a cloud gateway (see "CGW1") is deployed in public cloud environment 100. From the perspective of network device 160 and SVM1 150, network device 160 is capable of communicating with SVM1 150 natively (e.g., sending and receiving decapsulated packets without tunnel and encapsulation) at a higher throughput because they are located in the same virtual network 102.

In practice, each virtual network 101/102/103 in public cloud environment 100 may be configured with a classless inter-domain routing (CIDR) block, such as first CIDR block=11.0.0.0/16 for VPC1 101, second CIDR block=10.0.0.0/16 for VPC2 102, third CIDR block=12.0.0.0/16 for VPC3 103, etc. Depending on the desired implementation, each CIDR block may be further divided into subnets. As used herein, a "network device" may be implemented using one or more virtual machines (VMs) and/or physical machines (also known as "bare metal machines") in public cloud environment 100 and capable of performing functionalities of a gateway, switch, router, bridge, any combination thereof, etc.

According to examples of the present disclosure, a higher throughput may be achieved at SVM1 150. For example, since it is not necessary to establish any tunnel (e.g., using Internet Protocol Security (IPSec)) between CGW1 160 and SVM1 150, resource-intensive IPSec-related operations (e.g., encryption and decryption) may be eliminated to improve throughput performance. Service insertion according to examples of the present disclosure may be implemented for east-west traffic (see FIG. 1 and FIG. 6) and/or north-south traffic (see FIG. 7) in public cloud environment 100.

As used herein, the term "service path" may refer generally to a path between a source and a destination through which packets are steered to provide service(s) to the packets. A service path may include at least one "service virtualized computing instance" configured to provide a "service." The term "service" may be any suitable networking or non-networking service, such as firewall, load balancing, NAT, intrusion detection, deep packet inspection (DPI), traffic shaping, traffic optimization, packet header enrichment or modification, packet tagging, content filtering, etc. It should be understood that the packet processing operation(s) associated with a service may or may not modify the content (i.e., header and/or payload) of the packets. The term "endpoint" may refer generally an originating node ("source endpoint") or terminating node ("destination endpoint") of a bi-directional inter-process communication flow.

Figure 3:
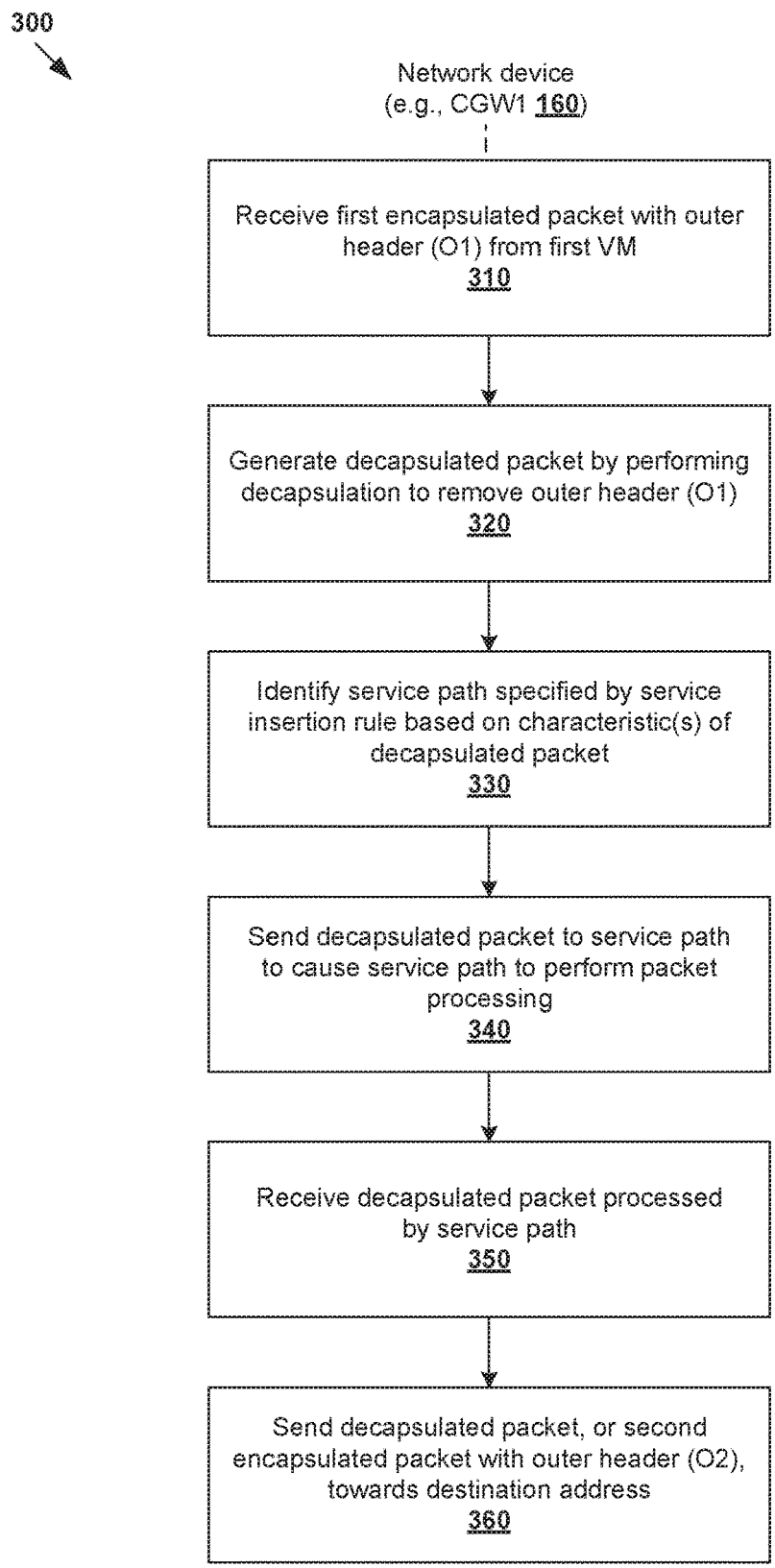
FIG. 3 is a flowchart of an example process for a network device to perform service insertion in a public cloud environment.

In more detail, FIG. 3 is a flowchart of example process 300 for network device 160 to perform service insertion in public cloud environment 100. Example process 300 may include one or more operations, functions, or actions illustrated by one or more blocks, such as 310 to 360. The various blocks may be combined into fewer blocks, divided into additional blocks, and/or eliminated depending on the desired implementation. In the following, various examples will be discussed using VM1 110 as an example "first virtualized computing instance" or "first endpoint," VM2 120 as example "second virtualized computing instance" or "second endpoint," CGW1 160 as example "network device," and SVM1 150 as example "service virtualized computing instance" on service path 104. Although the terms "first" and "second" are used to describe various elements, these elements should not be limited by these terms. These terms are used to distinguish one element from another. For example, a first element may be referred to as a second element, and vice versa.

At 310 and 320 in FIG. 3, in response to receiving a first encapsulated packet (see 170 in FIG. 1) from VM1 110, CGW1 160 performs decapsulation to generate a decapsulated packet (see 172 in FIG. 1) by removing a first outer header from the first encapsulated packet. For example in FIG. 1, the first outer header labelled "O1" may be addressed from source VM1 110 (e.g., IP address=IP-VM1) located in first virtual network 101 to destination CGW1 160 (e.g., IP address=IP-CGW) located in second virtual network 102.

At 330 in FIG. 3, based on one or more characteristics (e.g., a destination address) of decapsulated packet 172, CGW1 160 identifies service path 104 specified by a service insertion rule (see 161), and sends decapsulated packet 172 to service path 104. Here, the term "service insertion rule" or "service insertion policy" may refer generally to a rule (e.g., table entry) specifying a service path associated with at least one characteristic of a packet such that the packet may be forwarded to the service path for processing.

For example in FIG. 1, block 330 may involve matching a characteristic (e.g., destination address=IP-VM2) associated with a destination CIDR block (e.g., 12.0.0.0/16) specified by service insertion rule 161. CIDR3=12.0.0.0/16 represents a CIDR block configured for virtual network 103 in which VM2 120 is located. Other characteristics of the packet upon which a service path decision may be based may include other header values such as a source address, port number, or meta data associated with the packet maintained, compiled, or retrieved by the network device. Service insertion rule 161 further specifies corresponding (target=SVM1) that identifies service path 104, or more particularly SVM1 150 located on service path 104.

At 340 in FIG. 3, CGW1 160 may send decapsulated packet 172 to service path 104 to cause service path 104 to process decapsulated packet 172 according to one or more services. SVM1 150 may be the only SVM on service path 104 (as shown in FIG. 1 for simplicity), or the first SVM in a service chain on service path 104. Since SVM1 150 and CGW1 160 are both located in second virtual network 102 associated with second CIDR block (CIDR2)=10.0.0.0/16, it is not necessary to establish any tunnel (e.g., IPSec) between them and to perform encapsulation on decapsulated packet 172 before sending it to SVM1 150. This improves the efficiency and throughput of SVM1 150.

As will be discussed using FIGS. 4-6, service insertion rule 151 specifying (destination CIDR=12.0.0.0/16, target=CGW1) may be configured at SVM1 150 to cause SVM1 150 to send any processed decapsulated packet back to CGW1 160. Depending on the desired implementation, service insertion rule 151/161 may be a route configured or programmed on a route table (e.g., AWS/Azure route table) associated with a subnet interface (e.g., 511-512 in FIG. 5). In practice, more general service insertion rules with (destination=0.0.0.0/0) may be configured to facilitate service insertion for bidirectional, east-west and north-south traffic.

At 350 and 360 in FIG. 3, in response to CGW1 160 receiving the decapsulated packet (see 174 in FIG. 1) processed by service path 104, CGW1 160 sends the decapsulated packet towards the destination address. Alternatively, block 360 may involve generating and sending a second encapsulated packet towards the destination address. In the example in FIG. 1, a second encapsulated packet (see 176) is generated by encapsulating the decapsulated packet (see 174) with a second outer header (labelled "O2") that is addressed from CGW1 160 to destination VM2 120 located in third virtual network 103.

Depending on the desired implementation, service path 104 may perform packet modification (i.e., decapsulated packet 172 is different to 174), or not (i.e., 172 same as 174). For example, SVM1 150 implementing a firewall service usually does not modify the header and payload of decapsulated packet 174. In contrast, SVM1 150 implementing a NAT service will modify address information in decapsulated packet 174, such as by translating a private IP address to a public IP address, etc. As will be discussed further using FIGS. 4-6, CGW1 160 may store state information associated with decapsulated packet 172/174 to facilitate service insertion for response packets from VM2 120 to VM1 110. In practice, the destination address may be located in an external network (to be discussed using FIG. 7).

Configuration

Figure 4:
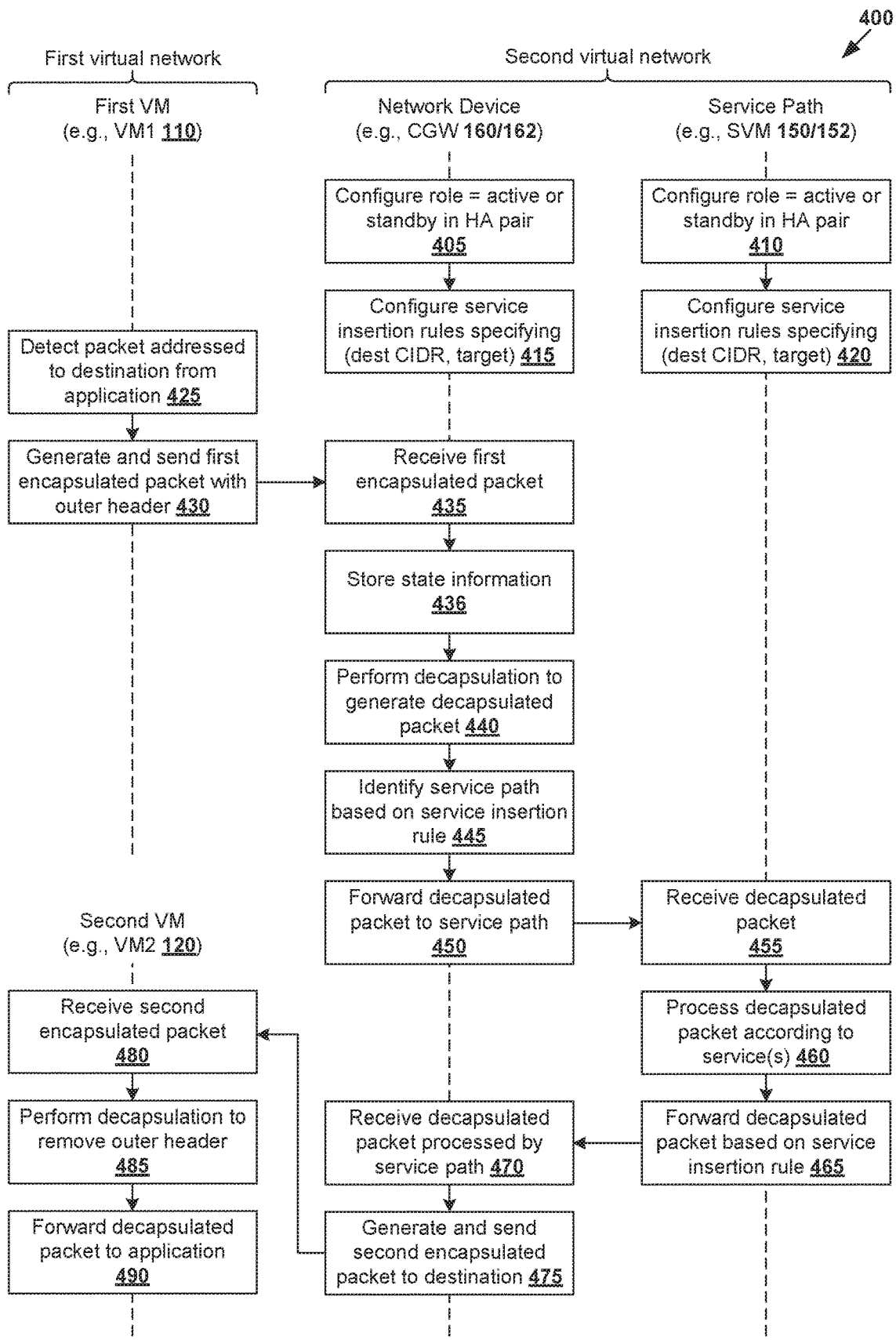
FIG. 4 is a flowchart of an example detailed process for service insertion in a public cloud environment.

FIG. 4 is a flowchart of example detailed process 400 for service insertion in public cloud environment 100. Example process 400 may include one or more operations, functions, or actions illustrated at 405 to 490. The various operations, functions or actions may be combined into fewer blocks, divided into additional blocks, and/or eliminated depending on the desired implementation. The example in FIG. 4 will be explained using FIG. 5, which is a schematic diagram illustrating first example of service insertion rule configuration 500 according to the example in FIG. 4.

Figure 5:
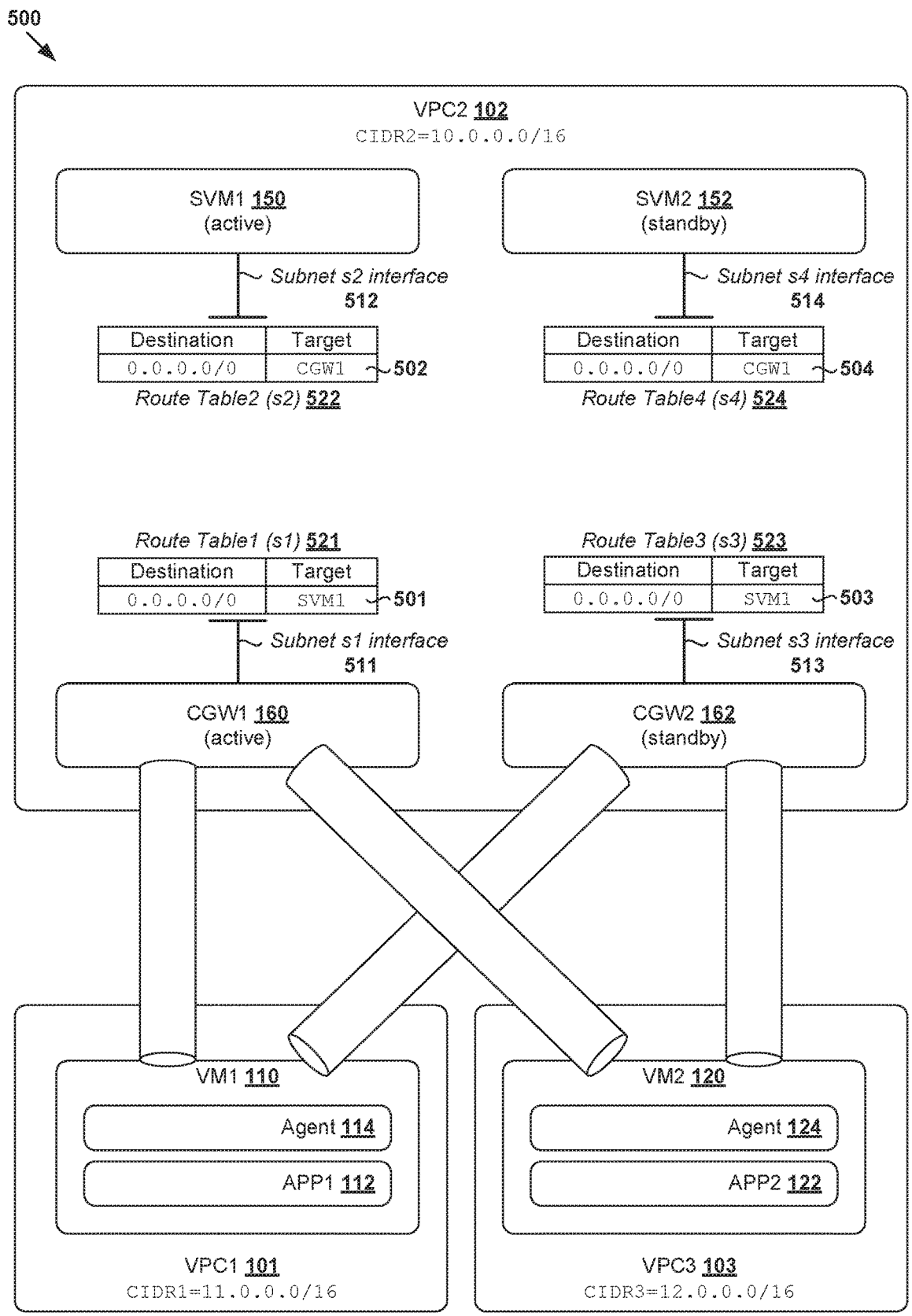
FIG. 5 is a schematic diagram illustrating first example of service insertion rule configuration according to the example in FIG. 4.

The examples in FIG. 4 and FIG. 5 may be implemented by SVMs 150-152, CGWs 160-162 and VMs 110-120 (e.g., using respective agents 114, 124). It should be understood that service insertion may also be implemented for any additional and/or alternative VMs, such as VM3 130 and VM4 140 (see FIG. 2). Using AWS as an example public cloud deployment, first virtual network 101 may represent a first VPC ("VPC1") associated with a first CIDR block ("CIDR1")=11.0.0.0/16. Second virtual network 102 may represent a second VPC ("VPC2") associated with a second CIDR block ("CIDR2")=10.0.0.0/16. Third virtual network 103 may represent a third VPC ("VPC3") associated with a third CIDR block ("CIDR3")=12.0.0.0/16. Virtual networks 101-103 are logically isolated from each other.

(a) High Availability (HA) Pairs

At 405 in FIG. 4, CGW1 160 and CGW2 162 are deployed in VPC2 102 to perform service insertion between VMs, such as VM1 110 in VPC1 101 and VM2 120 in VPC3 103. In the example in FIG. 5, CGW1 160 and CGW2 162 may be configured as a high availability (HA) pair. For example, CGW1 160 is assigned with role=primary (i.e., active), and CGW2 162 with role=secondary (i.e., standby) for fault tolerance purposes. Using the active-standby configuration, CGW1 160 usually operates as the active gateway, and CGW2 162 as the standby gateway. In case of a failure at the active gateway, the standby gateway initiates a switchover or failover process to take over as the active gateway to handle service insertion between VMs 110-120.

At 410 in FIG. 4, SVM1 150 and SVM2 152 are deployed in VPC2 102 to provide any suitable service (e.g., firewall). SVM1 150 and SVM2 152 may be configured as a HA pair. For example, SVM1 150 is assigned with role=primary (i.e., active), and SVM2 152 with role=secondary (i.e., standby). Using the active-standby configuration, SVM1 150 usually operates as the active SVM, and SVM2 152 as the standby SVM. Similarly, in case of a failure at the active SVM, the standby SVM may take over as the active SVM.

Using the active-standby configuration, any of the following combinations may be active at a particular instance: (CGW1 160, SVM1 150), (CGW1 160, SVM2 152), (CGW2 162, SVM1 150) and (CGW2 162, SVM2 152). To implement the active-standby configuration, each member of the HA pair is configured to detect the aliveness or failure of its peer. For example, a monitoring session may be established between members of the HA pair using any suitable fault detection or continuity check protocol, such as Border Gateway Protocol (BGP), etc.

For example, using a monitoring session, CGW1 160 and CGW2 162 may monitor each other's status (i.e., alive or not) through control messages. Similarly, another session may be established between SVM1 150 and SVM2 152. Additionally or alternatively, members of each HA pair may also detect the aliveness by exchanging heartbeat messages. It should be understood that examples of the present disclosure may be implemented for active-active configuration, in which case all members of a HA pair are active at the same time.

(b) Service Insertion Rules

At 415 and 420 in FIG. 4, service insertion rules 501-504 in FIG. 5 are configured for respective CGW1 160, SVM1 150, CGW2 162, and SVM2 152. In practice, the configuration at blocks 405-420 may be performed based on control information (e.g., instructions) from a network management entity. Service insertion rules 501-504 represent a set of rules (called routes or route table entries) that are used to determine how traffic is routed within VPC2 102. It should be understood that route tables 521-524 may include other route(s) that are not shown for simplicity.

Referring to CGW1 160, first service insertion rule 501 (see route table 521) is configured for subnet "s1" interface 511 to steer packets to the active SVM1 150. First rule 501 specifies (destination=0.0.0.0/0, target=SVM1) to facilitate service insertion for packets destined for any destination, including a destination address in CIDR3=12.0.0.0/16 associated with VPC3 103. At SVM1 150, second service insertion rule 502 (see route table 522) is configured for subnet "s2" interface 512. Second rule 502 specifies (destination=0.0.0.0/0, target=CGW1) to forward (processed) packets back to CGW1 160. Compared with the example in FIG. 1 (see 151, 161), service insertion rules 501-502 in FIG. 5 are more general and not limited to a specific destination (e.g., 12.0.0.0/16).

Similarly, at CGW2 162, third rule 503 (see route table 523) is configured for subnet "s3" interface 513 to steer packets to active SVM1 150. At SVM 2 152, fourth rule 504 (see route table 524) is configured for subnet "s4" interface 514 to forward (processed) packets back to the active CGW1 160. In practice, service insertion rules 501-504 may be routes programmed on respective route tables 521-524 (e.g., Azure or AWS route tables supported by a public cloud provider).

Block 415 in FIG. 4 may involve CGW 160/162 identifying the active SVM using any suitable approach. For example, using a layer-3 approach, CGW 160/162 may establish peering sessions with respective SVM1 150 and SVM2 152, such as using Border Gateway Protocol, etc. This way, CGW 160/162 may learn routes through route advertisements to update their service insertion rules accordingly. In another example, CGW 160/162 may identify the active SVM using a bump-in-the-wire approach. For example, two additional interfaces may be configured at CGW1 160 to forward and receive from SVM2 152. In this case, CGW1 160 may send dummy BFD traffic to SVM1 150 and SVM2. Depending on whether a response is received from SVM1 150 or SVM2 152, CGW1 160 may identify the active SVM. Similar operations may be performed by CGW2 162, as well as SVMs 150-152.

Service Insertion for East-West Traffic

Figure 6:
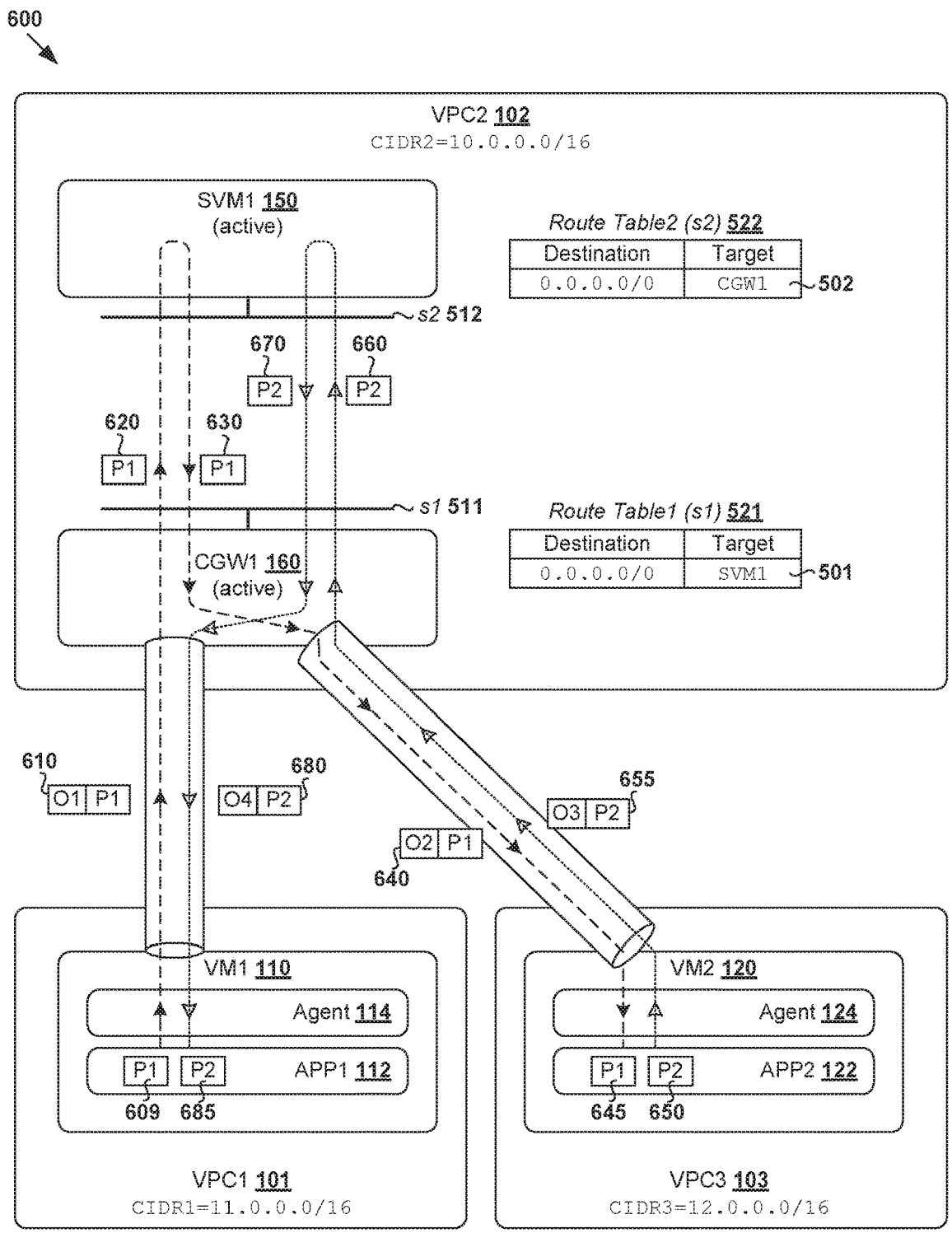
FIG. 6 is a schematic diagram illustrating an example service insertion for east-west traffic in a public cloud environment according to the example in FIG. 4.

FIG. 6 is a schematic diagram illustrating example service insertion 600 for east-west traffic in public cloud environment 100 according to the example in FIG. 4. Referring to FIG. 4 again, at 425 and 430, in response to detecting an egress packet with data originating from application (APP1) 112 and destined for VM2 120, VM1 110 generates and sends an encapsulated packet to the active CGW.

In the example in FIG. 6, egress packet 609 (labelled "P1") includes an inner header that is addressed from source=IP-VM1 associated with VM1 110 in VPC1 101 to destination=IP-VM2 associated with VM2 120 in VPC3 103. IP-VM1 belongs to CIDR1=11.0.0.0/16, and IP-VM2 to CIDR3=12.0.0.0/16. In response to detecting packet P1 609, agent 114 may generate encapsulated packet 610 by encapsulating packet P1 609 with an outer header ("O1"). The outer header is addressed from IP-VM1 to IP-CGW associated with the active CGW, say CGW1 160. Any suitable tunneling protocol may be used between CGW 160/162 and VM 110/120, such as Generic Network Virtualization Encapsulation (GENEVE), etc.

At 435 and 440 in FIG. 4, in response to receiving encapsulated packet 610 from VM1 110, CGW1 160 performs decapsulation to remove the outer header. At 436 in FIG. 4, CGW1 160 may also store state information associated with the packet flow to handle processed packets from active SVM1 150 (to be explained further below). Any suitable state information may be stored, such as five-tuple information (source IP address=IP-VM1, destination IP address=IP-VM2, source port number, destination port number, protocol), packet sequence number, etc. The state information may be used to ensure that a particular service insertion rule is not applied by CGW1 160 twice (i.e., once when a packet is received from VM1 110, and another when the packet is received from SVM1 150 after processing)

Further, at 445 and 450, CGW1 160 identifies SVM1 150 on service path 104 and forwards the decapsulated packet (see 620) to SVM1 150 for packet processing. Block 445 may involve CGW1 160 matching destination address=IP-VM2 (or other packet characteristic) with service insertion rule 501, which specifies (destination=0.0.0.0/0, target=SVM1). As discussed using block 415, decapsulated packet 620 is forwarded to SVM1 150 that is assigned with the active role. In the event of a failure at SVM1 150, decapsulated packet 620 will be forwarded to SVM2 152 instead.

At 455 and 460 in FIG. 4, in response to receiving decapsulated packet 620, SVM1 150 performs any necessary packet processing. Using a firewall service as an example, SVM1 150 may determine whether to allow or drop decapsulated packet 620 based on a firewall rule. At 465, after performing packet processing (and decapsulated packet 620 is not dropped), SVM1 150 forwards processed packet 630 to CGW1 160 according to service insertion rule 602 specifying (destination=0.0.0.0/0, target=CGW1) in route table 522.

At 470 and 475 in FIG. 4, in response to receiving processed packet 630 from SVM1 150, CGW1 160 generates and sends encapsulated packet 640 to destination VM2 120 in VPC3 103. Encapsulated packet 640 includes processed packet 630 and a second outer header (O2) that is addressed from source IP-CGW to destination IP-VM2 associated with VM2 120.

At 480, 485 and 490 in FIG. 4, in response to receiving encapsulated packet 640 with the outer header (O2), VM2 120 (e.g., using agent 124) performs decapsulation to remove the outer header and forwards decapsulated packet 645 to application (APP2) 122, thereby completing the end-to-end packet forwarding process with service insertion operations by CGW1 160 and SVM1 150.

It should be understood that, unlike conventional approaches, CGW1 160 and SVM1 150 may communicate natively (i.e., without any tunnel and encapsulation) in VPC2 102. From the perspective of CGW1 160, CGW1 160 forwards/receives packets in decapsulated form to/from SVM1 150. From the perspective of SVM1 150, SVM1 150 forwards/receives decapsulated packets in decapsulated form to/from CGW1 160. Since it is not necessary for SVM1 150 to perform encapsulation and decapsulation operations, service insertion throughput may be improved. Further, since IPSec tunnels are not used between CGW1 160 and SVM1 150, it is not necessary to perform encryption and decryption operations, which may be resource-intensive.

It should be understood that example process 400 in FIG. 4 may be performed for the reverse traffic from VM2 120 to VM1 110. See corresponding packets 650-685 in FIG. 6. In this case, source VM2 120 may perform blocks 425-430 to detect response packet 650 ("P2") from APP2 122, and to generate and send encapsulated response packet 655 with an outer header ("O3") to CGW1 160. CGW1 160 may perform service insertion according to blocks 435-450 and 470-475. SVM1 150 may perform packet processing according to blocks 455-465. See decapsulated packets 660-670. At destination VM1 110, in response to receiving encapsulated packet 680 with an outer header ("O4"), blocks 480-490 may be performed to generate and send decapsulated packet 685 to APP1 112. Various details explained using FIG. 4 are applicable to the return traffic and will not be repeated here for brevity.

Service Insertion for North-South Traffic

Figure 7:
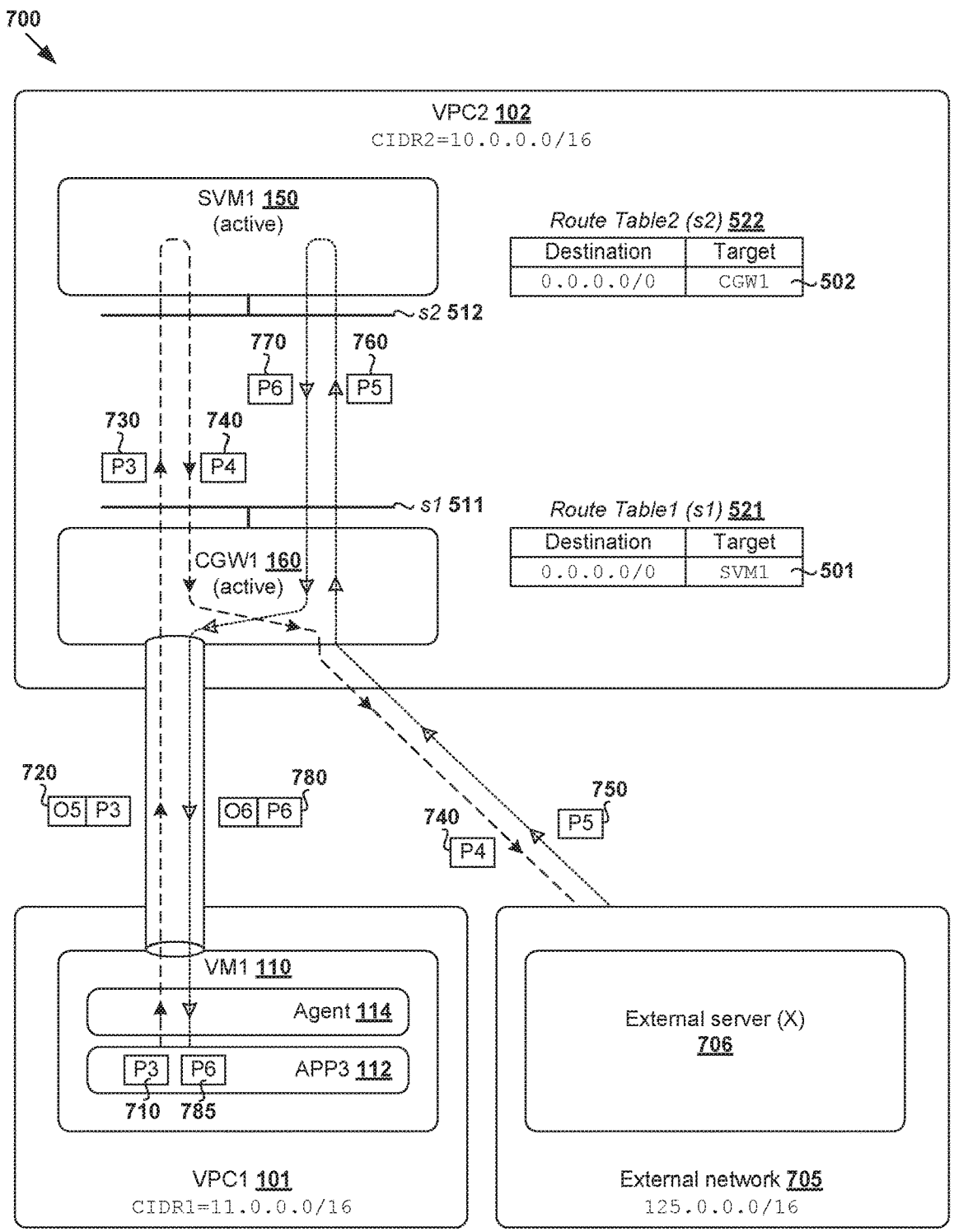
FIG. 7 is a schematic diagram illustrating an example service insertion for north-south traffic in a public cloud environment according to the example in FIG. 4.

FIG. 7 is a schematic diagram illustrating example service insertion 700 for north-south traffic in public cloud environment 100 according to the example in FIG. 4. In the following, consider service insertion for a packet flow between VM1 110 in VPC1 101 and a destination (see external server "X" 706) located in external network 705 (i.e., external to public cloud environment 100). In practice, CGW1 160 may be connected to external network 705 via various intermediate network devices (e.g., routers, switches).

Using an active-standby configuration, SVM1 150 and CGW1 160 are each assigned with role=active, and SVM2 152 and CGW2 162 (not shown in FIG. 7 for simplicity) with role=standby. To facilitate service insertion for north-south traffic, service insertion rules 501-502 may be configured at respective CGW1 160 and SVM1 150 according to blocks 415-420 in FIG. 4. Referring route table 521 in FIG. 7, service insertion rule 501 is configured for subnet "s1" interface 511 associated with CGW1 160. Referring route table 522 in FIG. 7, service insertion rule 502 is configured for subnet "s2" interface 512 associated with SVM1 150.

Service insertion rules 501-502 are general rules to facilitate service insertion for all traffic, including north-south traffic to external network 705. Similar to the examples in FIG. 5 and FIG. 6, service insertion rules 501-502 may be routes programmed on respective route tables 521-522 (e.g., Azure or AWS route tables supported by a public cloud provider). Depending on the desired implementation, more specific rules may be configured, such as a rule for forward traffic to external network 705 (e.g., 125.0.0.0/16) and another rule for return traffic from external network 705 to VPC1 101 (e.g., 11.0.0.0/16).

(a) Egress Packets to External Network

Referring also to FIG. 4, source VM1 110 may perform blocks 425-430 to detect egress packet 710 ("P3") from APP1 112, and to generate and send encapsulated packet 720 with an outer header ("O5") to CGW1 160. The outer header is addressed from source IP-VM1 associated with VM1 110 to destination IP-CGW associated with CGW1 160. Based on service insertion rule 501 configured for subnet "s1" interface 511, CGW1 160 may perform blocks 435-450 to perform decapsulation and send decapsulated packet 720.

In the example in FIG. 7, SVM1 150 may be configured to perform NAT for packets to and from external network 705. In this case, SVM1 150 may perform NAT on decapsulated packet 720 according to blocks 455-465, such as by translating a private IP address (e.g., IP-VM1) associated with VM1 110 to a public IP address (e.g., IP-Y). SVM1 150 then forwards the resulting (i.e., processed) decapsulated packet 740 ("P4") to CGW1 160 based on service insertion rule 502 for subsequent transmission to external server 706 in external network 705.

(b) Ingress Packets from External Network

In response to receiving ingress packet 750 ("P5") from external server 706, CGW1 160 may steer ingress packet 750 to SVM1 150 according to service insertion rules 501. SVM1 150 may perform NAT on ingress packet 750, such as by translating a public IP address (e.g., IP-Y) associated with VM1 110 to its private IP address (e.g., IP-VM1). SVM1 150 then forwards processed packet 750 ("P6") to CGW1 160 based on service insertion rule 502 for subsequent transmission to VM1 110. In particular, CGW1 may perform encapsulation to encapsulate processed packet 750 with an outer header ("O6") that is addressed from source IP-CGW to destination IP-VM1.

Unlike conventional approaches discussed using FIG. 1, a service may be inserted natively between endpoints without using any IPSec tunnels and encapsulation between CGW1 160 and SVM1 150. According to examples of the present disclosure, it is not necessary to have any access to the underlying hypervisor(s) supporting CGW1 160 and SVM1 150 in public cloud environment 100 to implement service insertion for the east-west traffic in FIG. 6 and north-south traffic in FIG. 7.

Failure Handling for HA Pairs (a) Control-Plane Route Exchange Approach

Figure 8A:
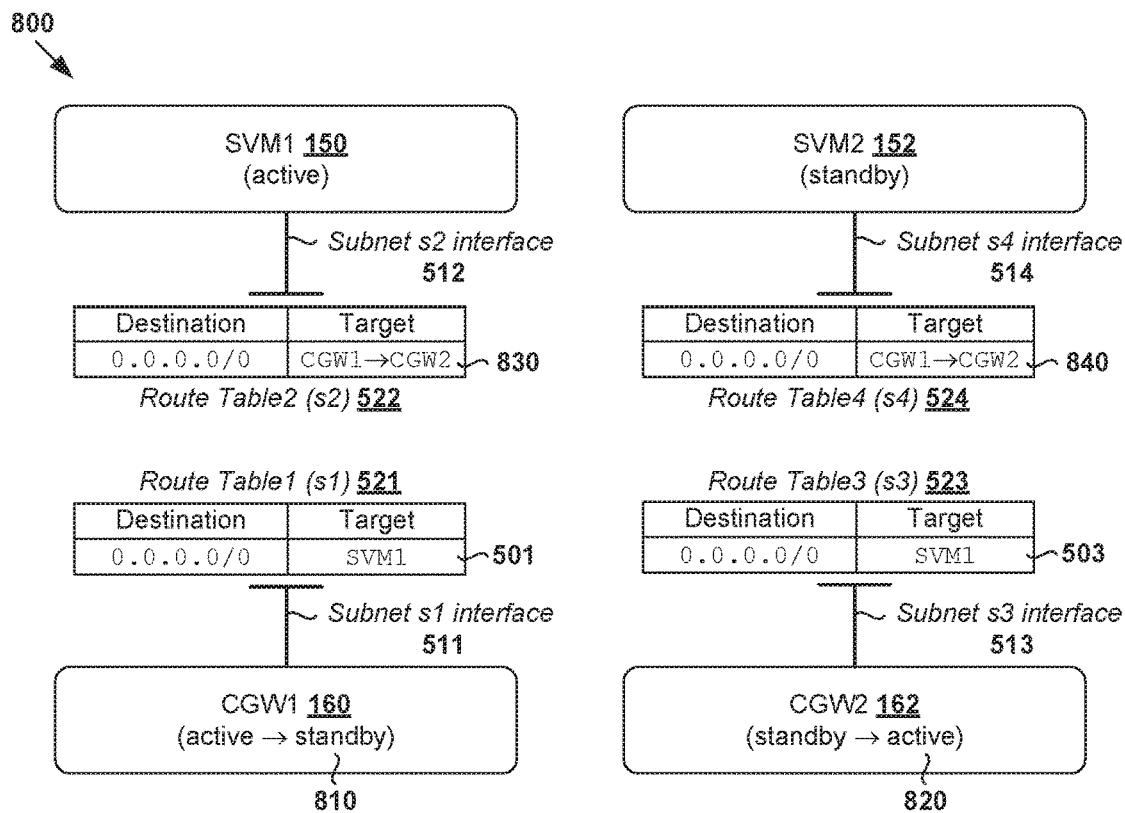
FIG. 8A is a schematic diagram illustrating a first example of failure handling for a first high availability (HA) pair in a public cloud environment.

FIG. 8A is a schematic diagram illustrating first example 800 of failure handling for a first HA pair in public cloud environment 100. As discussed using FIG. 4 and FIG. 5, CGW1 160 and CGW2 162 are configured as a HA pair in VPC2 102. For fault tolerance purposes, CGW1 160 is assigned with role=active and CGW2 162 with role=standby. In case of a failure at CGW1 160 (see 810), CGW2 162 may initiate a switchover or failover process to take over as the active gateway.

In the example in FIG. 8A, CGW2 162 transitions from role=standby to active (see 820). Using a control-plane route exchange protocol (e.g., BGP), CGW2 162 may send a control-plane advertisement to advertise itself as the active gateway to SVM1 150 and SVM2 152. At 830, active SVM1 150 may update a service insertion rule configured for subnet "s2" interface 512 to (destination=0.0.0.0/0, target=CGW2). Similarly, at 840, standby SVM2 152 may update a service insertion rule configured for subnet "s4" interface 514 to (destination=0.0.0.0/0, target=CGW2).

Figure 8B:
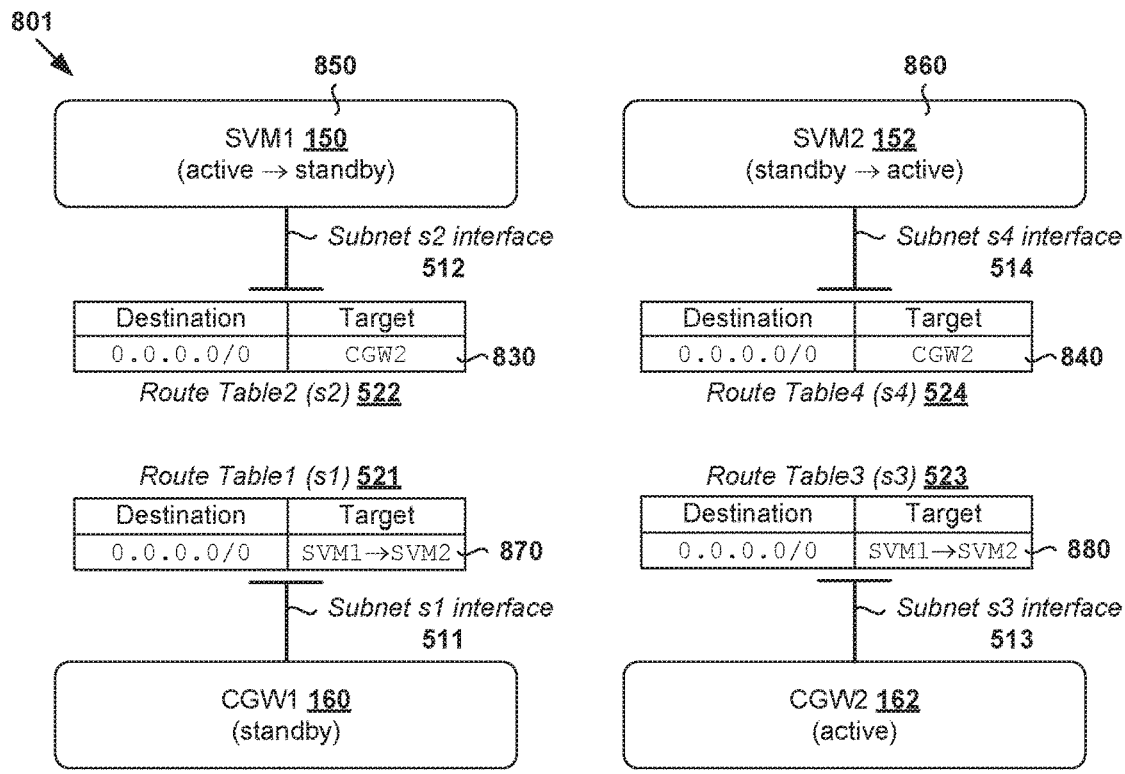
FIG. 8B is a schematic diagram illustrating a second example of failure handling for a second HA pair in a public cloud environment.

FIG. 8B is a schematic diagram illustrating second example 801 of failure handling for a second HA pair in public cloud environment 100. As discussed using FIG. 4 and FIG. 5, SVM1 150 and SVM2 152 are configured as a HA pair in VPC2 102. For fault tolerance purposes, SVM1 150 is assigned with role=active and SVM2 152 with role=standby. In case of a failure at CGW1 160 (see 850), SVM2 152 may initiate a switchover or failover process to take over as the active SVM.

In the example in FIG. 8B, SVM2 152 transitions from role=standby to active (see 860). Using a control-plane route exchange protocol (e.g., BGP), SVM2 152 may send a control-plane advertisement to advertise itself as the active SVM to CGW1 160 and CGW2 162. At 880, CGW2 162 (i.e., active after failure 810 of CGW1 160) may update a service insertion rule configured for subnet "s3" interface 513 to (destination=0.0.0.0/0, target=SVM2). At 870, standby CGW1 160 may update a service insertion rule configured for subnet "s1" interface 511 to (destination=0.0.0.0/0, target=SVM2). Similar updates may be performed for general rules with destination=0.0.0.0/0 (not shown in FIG. 8B).

(b) Data-Plane Probe-Based Approach

Figure 9:
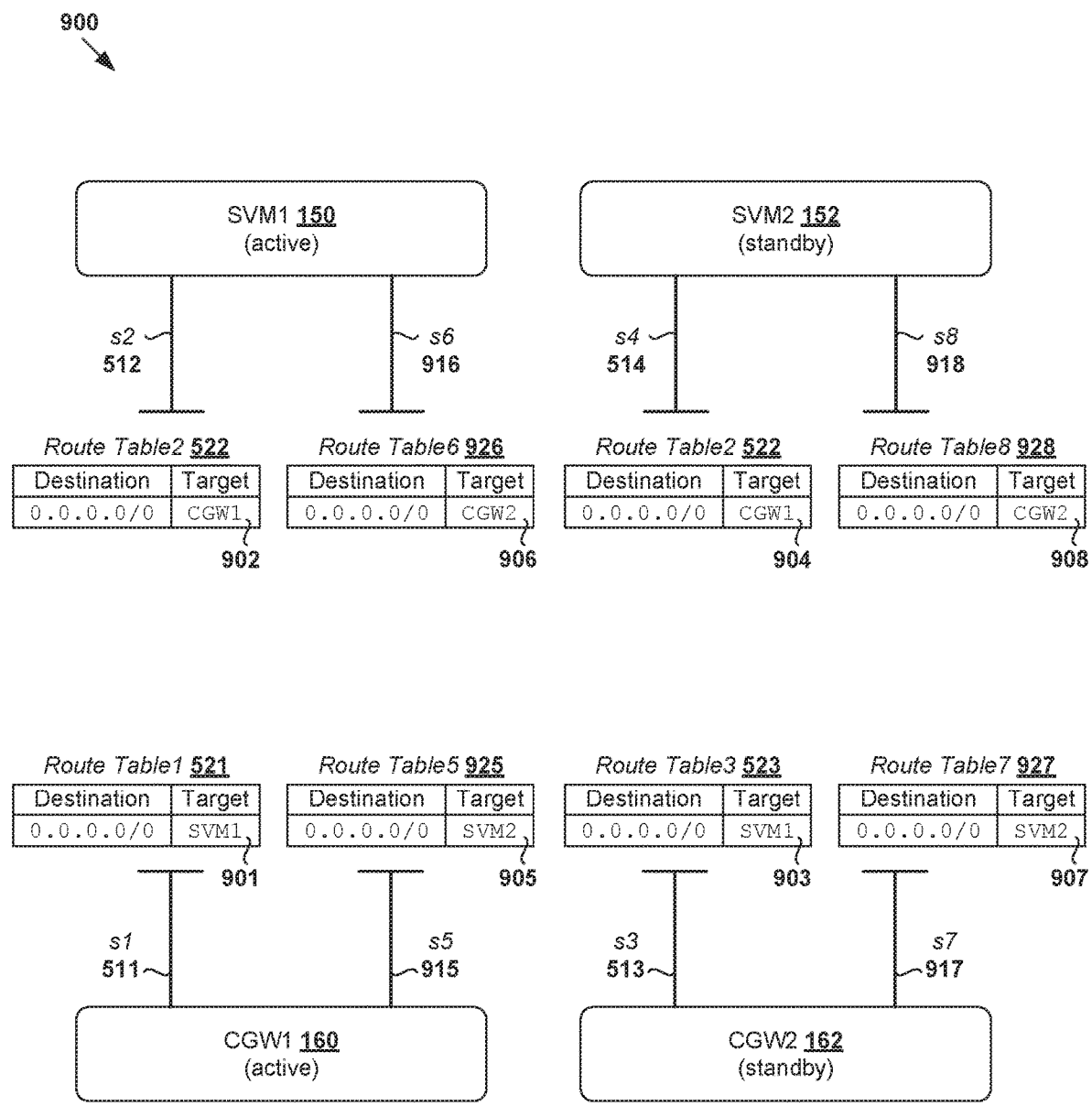
FIG. 9 is a schematic diagram illustrating a third example of failure handling in a public cloud environment.

In practice, any suitable number of subnet interfaces may be configured for CGW 160/162 and SVM 150/152. In the example in FIG. 5, four example subnets 511-514 are configured. An example with eight subnet interfaces are shown in FIG. 9, which is a schematic diagram illustrating third example 900 of failure handling according to the example in FIG. 4.

Referring to active CGW1 160, route table 521 stores (destination=0.0.0.0/0, target=SVM1) configured for subnet "s1" interface 511 to steer packets to SVM1 150. Route table 925 stores (destination=0.0.0.0/0, target=SVM2) configured for subnet "s5" interface 915 to steer packets to SVM2 152. See corresponding rules 901, 905.

Referring to standby CGW2 162, route table 523 (destination=0.0.0.0/0, target=SVM1) configured for subnet "s3" interface 513 to steer packets to SVM1 150. Route table 927 stores (destination=0.0.0.0/0, target=SVM2) configured for subnet "s7" interface 917 to steer packets to SVM2 152. See corresponding rules 903, 907.

Referring to active SVM1 150, route table 522 stores (destination=0.0.0.0/0, target=CGW1) configured for subnet "s2" interface 512 to steer packets to CGW1 160. Route table 926 stores (destination=0.0.0.0/0, target=CGW2) configured for subnet "s6" interface 916 to steer packets to CGW2 162. See corresponding rules 902, 906.

Referring to standby SVM2 152, route table 524 (destination=0.0.0.0/0, target=CGW1) configured for subnet "s4" interface 514 to steer packets to CGW1 160. Route table 928 stores (destination=0.0.0.0/0, target=CGW2) configured for subnet "s8" interface 918 to steer packets to CGW2 162. See corresponding rules 904, 908.

In the example in FIG. 9, CGW1 160 and CGW2 162 may use a data-plane, probe-based approach to detect whether SVM1 150 or SVM2 152 is active. For example, CGW1 160 may send periodic data-plane probes destined for itself on both subnet interfaces "s1" 511 and "s5" 915. The standby SVM (e.g., 152) would drop all probes. The active SVM (e.g., 150) would route the probes back to CGW1 160. This way, CGW1 160 may identify that SVM1 150 is active if the data-plane probes return via "s1" 511. Otherwise, SVM2 152 is active (i.e., data-plane probes return via "s5" 915). CGW2 162 may use the same approach by sending periodic data-plane probes on "s3" 513 and "s7" 917.

Similarly, SVM1 150 and SVM2 152 may use the data-plane, probe-based approach to detect whether CGW1 160 and CGW2 162 is active. For example, SVM1 150 may send periodic data-plane probes destined for itself on both subnet interfaces "s2" 512 and "s6" 916. The standby CGW (e.g., 162) would drop all probes. The active CGW (e.g., 160) would route the probes back to SVM1 150. This way, SVM1 150 may identify that CGW1 160 is active if the data-plane probes return via "s2" 512. Otherwise, CGW2 162 is active (i.e., data-plane probes return via "s6" 916). SVM2 152 may use the same approach by sending periodic probes on "s4" 514 and "s8" 918.

Container Implementation

Although explained using VMs 110-120, it should be understood that public cloud environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 9, container technologies may be used to run various containers inside respective VMs 110-120. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 9. For example, the instructions or program code, when executed by the processor of the computer system, may cause the processor to implement a "network device" to perform service insertion according to examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a network device to perform service insertion in a public cloud environment that includes a first virtual network and a second virtual network, wherein the method comprises:

configuring a first service insertion rule, by the network device, in a route table associated with a subnet interface associated with the network device, wherein the first service insertion rule specifies a first classless inter-domain routing (CIDR) block and a first service virtualized computing instance different from the network device and located on a service path in the second virtual network;

after configuring the first service insertion rule and then in response to receiving a first encapsulated packet from a first virtualized computing instance located in the first virtual network, generating, by the network device, a decapsulated packet by performing decapsulation to remove, from the first encapsulated packet, a first outer header that is addressed from the first virtualized computing instance to the network device;

based on one or more characteristics of the decapsulated packet, identifying, by the network device, the service path specified by the first service insertion rule, wherein the first service virtualized computing instance and the network device are both located in the second virtual network;

based on the first service insertion rule, sending, by the network device, the decapsulated packet to the first service virtualized computing instance to cause the service path to process the decapsulated packet according to one or more services; and in response to the network device receiving the decapsulated packet processed by the service path, sending, by the network device, the decapsulated packet, or generating and sending, by the network device, a second encapsulated packet that includes a second outer header and the decapsulated packet, towards a destination address of the decapsulated packet.

2. The method of claim 1, wherein identifying the service path comprises:

matching the destination address in the decapsulated packet to a first classless inter-domain routing (CIDR) block specified by the first service insertion rule.

3. The method of claim 1, wherein sending the decapsulated packet to the service path comprises:

identifying that the first service virtualized computing instance is assigned with an active role based on a control-plane advertisement or a data-plane probe from the first service virtualized computing instance, wherein the first service virtualized computing instance and a second service virtualized computing instance are configured as a high availability (HA) pair.

4. The method of claim 1, wherein sending the decapsulated packet towards the destination address comprises:

sending the decapsulated packet towards the destination address associated with a destination located in an external network, wherein the network device connects the first virtualized computing instance to the external network.

5. The method of claim 1, wherein generating the second encapsulated packet comprises:
generating the second encapsulated packet by encapsulating the decapsulated packet with a second outer header, wherein the second outer header is addressed from the network device to a second virtualized computing instance located in the first virtual network.

6. The method of claim 1, wherein the network device receiving the decapsulated packet processed by the service path is based on a second service insertion rule configured at an active service virtualized computing instance located on the service path and the second service insertion rule specifies the first CIDR block and the network device.

7. A non-transitory computer-readable storage medium that includes a set of instructions which, in response to execution by a processor of a network device, cause the processor to perform a method of service insertion in a public cloud environment that includes a first virtual network and a second virtual network, wherein the method comprises:
configuring a first service insertion rule, by the network device, in a route table associated with a subnet interface associated with the network device, wherein the first service insertion rule specifies a first classless inter-domain routing (CIDR) block and a first service virtualized computing instance different from the network device and located on a service path in the second virtual network;
after configuring the first service insertion rule and then in response to receiving a first encapsulated packet from a first virtualized computing instance located in the first virtual network,
generating, by the network device, a decapsulated packet by performing decapsulation to remove, from the first encapsulated packet, a first outer header that is addressed from the first virtualized computing instance to the network device;
based on one or more characteristics of the decapsulated packet, identifying, by the network device, the service path specified by the first service insertion rule, wherein the first service virtualized computing instance and the network device are both located in the second virtual network;
based on the first service insertion rule, sending, by the network device, the decapsulated packet to the first service virtualized computing instance to cause the service path to process the decapsulated packet according to one or more services; and
in response to the network device receiving the decapsulated packet processed by the service path,
sending, by the network device, the decapsulated packet, or generating and sending, by the network device, a second encapsulated packet that includes a second outer header and the decapsulated packet, towards a destination address of the decapsulated packet.

8. The non-transitory computer-readable storage medium of claim 7, wherein identifying the service path comprises:
matching the destination address in the decapsulated packet to a first classless inter-domain routing (CIDR) block specified by the first service insertion rule.

9. The non-transitory computer-readable storage medium of claim 7, wherein sending the decapsulated packet to the service path comprises: identifying that the first service virtualized computing instance is assigned with an active role based on a control-plane advertisement or a data-plane probe from the first service virtualized computing instance, wherein the first service virtualized computing instance and a second service virtualized computing instance are configured as a high availability (HA) pair.

10. The non-transitory computer-readable storage medium of claim 7, wherein sending the decapsulated packet towards the destination address comprises:
sending the decapsulated packet towards the destination address associated with a destination located in an external network, wherein the network device connects the first virtualized computing instance to the external network.

11. The non-transitory computer-readable storage medium of claim 7, wherein generating the second encapsulated packet comprises:
generating the second encapsulated packet by encapsulating the decapsulated packet with a second outer header, wherein the second outer header is addressed from the network device to a second virtualized computing instance located in the first virtual network.

12. The non-transitory computer-readable storage medium of claim 7, wherein the network device receiving the decapsulated packet processed by the service path is based on a second service insertion rule configured at an active service virtualized computing instance located on the service path and the second service insertion rule specifies the first CIDR block and the network device.

13. A computer system configured to perform service insertion in a public cloud environment that includes a first virtual network and a second virtual network, wherein the computer system comprises:
a processor; and
a non-transitory computer-readable medium having stored thereon instructions that, when executed by the processor, cause the processor to:
configure a first service insertion rule, by the network device, in a route table associated with a subnet interface associated with the network device, wherein the first service insertion rule specifies a first classless inter-domain routing (CIDR) block and a first service virtualized computing instance different from the network device and located on a service path in the second virtual network;
after configuring the first service insertion rule and then in response to receiving a first encapsulated packet from a first virtualized computing instance located in the first virtual network,
generate a decapsulated packet by performing decapsulation to remove, from the first encapsulated packet, a first outer header that is addressed from the first virtualized computing instance to the computer system;
based on one or more characteristics of the decapsulated packet, identify the service path specified by the first service insertion rule, wherein the first service virtualized computing instance and the computer system are both located in the second virtual network;
based on the first service insertion rule, send the decapsulated packet to the first service virtualized computing instance to cause the service path to process the decapsulated packet according to one or more services; and
in response to the computer system receiving the decapsulated packet processed by the service path, send the decapsulated packet, or generate and send a second encapsulated packet that includes a second outer header and the decapsulated packet, towards a destination address of the decapsulated packet.

14. The computer system of claim 13, wherein the instructions for identifying the service path cause the processor to:
match the destination address in the decapsulated packet to a first classless inter-domain routing (CIDR) block specified by the first service insertion rule.

15. The computer system of claim 13, wherein the instructions for send the decapsulated packet to the service path cause the processor to: identify that the first service virtualized computing instance is assigned with an active role based on a control-plane advertisement or a data-plane probe from the first service virtualized computing instance, wherein the first service virtualized computing instance and a second service virtualized computing instance are configured as a high availability (HA) pair.

16. The computer system of claim 13, wherein the instructions for send the decapsulated packet towards the destination address cause the processor to:
send the decapsulated packet towards the destination address associated with a destination located in an external network, wherein the computer system connects the first virtualized computing instance to the external network.

17. The computer system of claim 13, wherein the instructions for generating the second encapsulated packet cause the processor to:
generate the second encapsulated packet by encapsulating the decapsulated packet with a second outer header, wherein the second outer header is addressed from the computer system to a second virtualized computing instance located in the first virtual network.

18. The computer system of claim 13, wherein the computer system receiving the decapsulated packet processed by the service path is based on a second service insertion rule configured at an active service virtualized computing instance located on the service path and the second service insertion rule specifies the first CIDR block and the computer system.

* * * * *